(12) United States Patent
Guttmann et al.

(10) Patent No.: US 6,195,218 B1
(45) Date of Patent: Feb. 27, 2001

(54) DISK DRIVE WHICH EFFICIENTLY STORES ZONE PARAMETER SETS FOR A PLURALITY OF DISK SURFACES

(75) Inventors: James Edward Guttmann; Michael Scott Hicken; Timothy W. Swatosh, all of Rochester, MN (US)

(73) Assignee: Western Digital Corporation, Irvine, CA (US)

( * ) Notice: Subject to any disclaimer, the term of this patent is extended or adjusted under 35 U.S.C. 154(b) by 0 days.

(21) Appl. No.: 09/105,122

(22) Filed: Jun. 25, 1998

(51) Int. Cl.⁷ .................................................. G11B 5/09
(52) U.S. Cl. .............................................. 360/51; 360/48
(58) Field of Search ........................... 360/51, 31, 46, 360/48; 711/112, 202, 205–206, 209, 178

(56) References Cited

U.S. PATENT DOCUMENTS

| | | |
|---|---|---|
| 5,537,264 | 7/1996 | Pinteric . |
| 5,596,458 | 1/1997 | Emo et al. . |
| 6,069,759 * | 5/2000 | Oh ........................................ 360/51 |

* cited by examiner

Primary Examiner—Hoa T. Nguyen
Assistant Examiner—Dan I. Davidson
(74) Attorney, Agent, or Firm—Milad G. Shara

(57) ABSTRACT

A disk drive and method which efficiently stores zone parameter sets for a plurality of disk surfaces. The disk drive includes a disk control system and a plurality of disk surfaces. Each disk surface has an associated transducer head in communication with the disk control system for reading and writing data to the disk surface. Each disk surface is subdivided into a plurality of zones. Control parameters sets for each zone of a disk surface are stored in table. The disk drive further comprises a first disk surface and a second disk surface. A first zone parameter table is provided for the first disk surface. The first zone parameter table comprising a zone control parameter set for each zone of the first disk surface. A second zone parameter table is provided. The second zone parameter table includes a number of zone control parameter sets, wherein the zone control parameter sets and the second zone parameter table are not included in the first zone parameter table. Means are provided for extracting zone control parameter sets for the second disk surface from the first zone parameter table and the second zone parameter table, a means for extracting zone control parameter sets including offset pointer to the first zone parameter table.

23 Claims, 8 Drawing Sheets

ZONE CONTROL PARAMETER TABLE

| MEMORY LOCATION | CONTROL PARAMETER SET | |
|---|---|---|
| 0 | A | TABLE 1 STANDARD PERFORMANCE TRANSDUCER HEADS |
| N | B | |
| 2N | C | |
| 3N | D | |
| 4N | E | |
| 5N | F | |
| 6N | G | |
| 7N | H | |
| 8N | I | |
| 9N | J | |
| 10N | K | TABLE 2 LOW PERFORMANCE TRANSDUCER HEAD |
| 11N | L | |
| 12N | M | |
| 13N | N | |
| 14N | O | |
| 15N | P | |
| 16N | Q | |
| 17N | R | |
| 18N | S | |
| 19N | T | |

Fig. 1
(Prior Art)

DISK DRIVE WHICH EFFICIENTLY STORES ZONE PARAMETER SETS FOR A PLURALITY OF DISK SURFACES

BACKGROUND OF THE INVENTION

1. Field of the Invention

The present invention relates to a disk drive, and more particularly, a disk drive and method for efficiently storing zone control parameter sets in memory for reading and writing data on a plurality of disk surfaces.

2. Description of the Prior Art

Disk drives store large volumes of data on a plurality of disks mounted on a spindle assembly. Each disk includes two disk surfaces which are capable of storing data. On each disk surface, user data is divided into groups of sectors and stored in concentric circular tracks located between an outside diameter and inside diameter of the disk. Embedded servo information is recorded in servo sectors placed in radially continuous narrow wedges between the groups of sectors. The information contained in the servo sectors may include track number (address), sector number, timing, and tracking information for positioning a transducer head over the disk surface.

It is desirable to keep a maximum uniform density of data stored on the surface of each disk, while minimizing disk error rates. Data tracks located near the inside diameter of the disk surface are much shorter than data tracks located near the outside diameter of the disk surface. To compensate for these physical differences, zone recording techniques are utilized where the rate (i.e., frequency) at which data is written to the disk surface increases from the inside tracks to the outside tracks to assure a uniform density of data while maximizing disk storage capacity. Although the recording rate could theoretically be optimized for each track, parameter storage and performance limitations dictate a compromise by establishing discrete recording frequencies.

In zone recording, groups of adjacent tracks are assigned to an array of zones between the inside track and the outside track of the disk surface. For example, there may be ten to sixteen zones across the disk surface. Although data is written at the same recording frequency within each zone, the recording frequency increases from zone to zone as the transducer head moves from the inside zones to the outside zones. Zone recording techniques are employed to maintain disk performance, including minimizing disk recording error rates, while more fully utilizing the storage capacity of each disk surface.

Each disk surface has a transducer head associated with it for reading and writing data on the disk surface. Transducer heads are manufactured to meet desired performance requirements such that data may be written to and read from each disk surface while maintaining acceptable error rates. In high volume manufacturing of disk drives with multiple transducer heads, there will be instances when one or more of the transducer heads may not meet design specifications. The remaining transducer heads are of a quality capable of operating at or above desired performance levels. If the frequency of the data written on the surface of the disc exceeds the ability of the low performance transducer heads to reliably recover the data, those heads may be termed "stressed" resulting in a higher disk reading error rate.

A low performing transducer head greatly affects the performance rating of the disk drive. If nothing is done to compensate for the low performing transducer head, the disk drive may be rejected for failure to meet specifications. One way to improve the error rate is to modify control parameters, including lowering recording frequency parameters for the disk drive to be within the performance range of the low performing transducer heads. If the recording frequency parameters for corresponding zones on all the disk surfaces are lowered to improve the error rate for the low performing transducer head, the remaining transducer heads are subjected to operating at a level below that which they are capable of performing. The result of uniformly lowering frequency parameters is a disk drive operating at a level below its potential capacity.

To avoid capacity loss in the face of a low performing head, a disk drive can use modified control parameters for an array of zones of a given disk surface relative to corresponding zones on other disk surfaces. Recording frequency is reduced, and error rates are improved. Now, only one disk surface of the disk drive has reduced capacity. The control parameters for the remaining disk surfaces may be adjusted to result in slightly raised capacity to compensate for the lost capacity of the modified parameter surface.

Control parameters for each zone are stored in nonvolatile memory. These control parameters are transferred to random access memory (RAM) upon disk drive start-up. By moving these control parameters into RAM, the disk drive has rapid access of these control parameters during disk drive operation, as the disk drive moves from disk surface to disk surface, and across each disk surface.

Use of modified control parameters requires an additional set of control parameters for each zone of the low performance disk surface to be stored into memory. FIG. 1 illustrates a prior art exemplary embodiment of a zone control parameter table stored in RAM for a disk drive having a set of control parameters for disk surfaces associated with a standard transducer head (TABLE 1) and a low performing transducer head (TABLE 2). Each disk surface has ten zones, wherein each zone is associated with a control parameter set stored in memory. Each control parameter set includes physical parameters which define the zone (such as number of sectors per track, skew values, etc.) and data channel related parameters (such as recording frequencies, thresholds, channel filter values, etc.), and as such, each control parameter set occupies a block of memory. Each respective zone of a disk surface associated with a standard transducer head uses a corresponding control parameter set in TABLE 1. For example, zone 1 uses control parameter set A, zone 2 uses control parameter set B, etc. In reference to the low performance transducer head, zones 1–10 of the associated disk surface are mapped to corresponding control parameter sets K–T of TABLE 2. By operating the low performance transducer heads using modified zone control parameters, the additional set of zone control parameters doubles the memory requirements in the table for storing zone control parameters. The resulting disk drive requires additional RAM for storing the modified control parameters and accordingly has less space available in RAM for other disk drive functions.

SUMMARY OF THE INVENTION

The present invention provides a disk drive and method for efficiently storing zone control parameter sets for a plurality of disk surfaces.

In one embodiment, the present invention provides a disk drive including a disk control system and a plurality of disk surfaces. Each disk surface has an associated transducer head in communication with the disk control system for reading and writing data at the disk surface. Each disk surface is subdivided into a plurality of zones, wherein control parameters sets for each zone of a disk surface are stored in a table. The disk drive further includes a first disk surface and a second disk surface. A first zone parameter table is provided for the first disk surface, the first zone parameter table comprising a zone control parameter set for each zone of the first disk surface. A second zone parameter table is provided, the second zone parameter table including a number of zone control parameter sets, wherein the zone control parameter sets in the second zone parameter table are not included in the first zone parameter table. Means are provided for extracting zone control parameter sets for the second disk surface from the first zone parameter table and the second zone parameter table. The means for extracting zone control parameter sets includes an offset pointer to the first zone parameter table.

The first zone parameter table and the second zone parameter table comprise an entry for each included zone control parameter set. The first zone parameter table and the second zone parameter table define a logical zone parameter table.

In one aspect, the offset pointer to the first zone parameter table include an offset magnitude, wherein the offset magnitude is equal to the number of zone control parameter sets in the second zone parameter table. In another aspect, the offset pointer to the first zone parameter table includes an offset magnitude, wherein the offset magnitude is equal to the number of zone parameter sets extracted from the second zone parameter table for the second disk surface.

Each zone control parameter set includes a recording frequency parameter. The zone control parameter sets in the first zone parameter table and the second zone parameter table are arranged in order of decreasing recording frequency parameter. In one aspect, the first zone parameter table and the second zone parameter table are stored in random access memory.

The disk drive may further include a third disk surface. The first zone parameter table may include a zone control parameter set for each zone of the third disk surface. In another aspect, the zone control parameter sets for the third disk surface are the same as the zone control parameter sets for the second disk surface.

The disk drive may include a third zone parameter table. The third zone parameter table includes a number of zone control parameter sets. The zone control parameters sets in the third zone parameter table are not included in the first zone parameter table and the second zone parameter table. The disk drive includes a third disk surface. Means are provided for extracting zone control parameter sets for the third disk surface from the first zone parameter table, the second zone parameter table, and the third zone parameter table. The means for extracting zone control parameter sets include a second offset pointer to the first zone parameter table. The second offset pointer to the first zone parameter table for the third disk surface may include an offset magnitude, wherein the offset magnitude is equal to the number of zone parameter sets extracted from the second zone parameter table and the third zone parameter table for the third disk surface.

In another embodiment, the present invention provides a method for improving performance of a disk drive including efficiently storing zone control parameters. The disk drive includes a disk control system and a plurality of disk surfaces. Each disk surface has an associated transducer head in communication with the disk control system for reading and writing data at the disk surface. Each disk surface is subdivided into a plurality of zones. Control parameter sets for each zone of a disk surface are stored in a table. They include the step of defining a first zone parameter table for a first disk surface. The first zone parameter table comprising a zone control parameter set for each zone of the first disk surface. A second zone parameter table is defined. The second zone parameter table includes a number of zone control parameter sets. The zone control parameter sets and the second zone parameter table are not included in the first zone parameter table. Zone control parameter sets for the second disk surface are extracted from the first zone parameter table and the second zone parameter table, using an offset pointer to the first zone parameter table. A command to write data to the first disk surface is executed using the first zone parameter table. A command is executed to write data to the second disk surface using the extracted zone control parameters for the second disk surface.

The steps of defining a first zone control parameter table and defining a second zone control parameter table may include providing an entry for each zone control parameter set. The step of using an offset pointer to the first zone parameter table may further comprise the step of defining an offset magnitude which is equal to the number of zone control parameter sets in the second zone parameter table. In another aspect, the offset magnitude is equal to the number of zone parameter sets extracted from the second zone parameter table for the second disk surface.

Each zone control parameter set is defined to include a recording frequency parameter. The zone control parameter sets are arranged in the first zone parameter table and the second zone parameter table in order of decreasing recording frequency. The first zone parameter table and the second zone parameter table may be stored in random access memory. Zone control parameter sets for a third disk surface may be extracted from the first zone parameter table.

The method may further include defining a third zone parameter table. The third zone parameter table includes a number of zone control parameter sets, wherein the zone control parameter sets are not included in the first zone parameter table and the second zone parameter table. Zone control parameter sets are extracted for a third disk surface from the first zone parameter table, the second zone parameter table and the third zone parameter table, including using a second offset pointer to the first zone parameter table. A command to write data to the third disk surface is executed using the extracted zone control parameter sets for the third disk surface. The step of using a second offset pointer to the first zone parameter table further comprises the step of defining a second offset magnitude which is equal to the number of zone parameter sets extracted from the second zone parameter table and the third zone parameter table for the third disk surface.

BRIEF DESCRIPTION OF THE DRAWINGS

The accompanying drawings are included to provide a further understanding of the present invention and are incorporated in and constitute a part of this specification. The drawings illustrate embodiments of the present invention and together with the description serve to explain the principles of the invention.

FIG. 1 illustrates two prior art tables for storing zone control parameters in memory;

DETAILED DESCRIPTION

The present invention provides a hard disk drive efficiently storing zone control parameter sets in tables in memory for multiple disk surfaces. The zone control parameter sets include zone dependent variables for controlling the read/write channel to read and write data on each disk surface.

Figure 2:
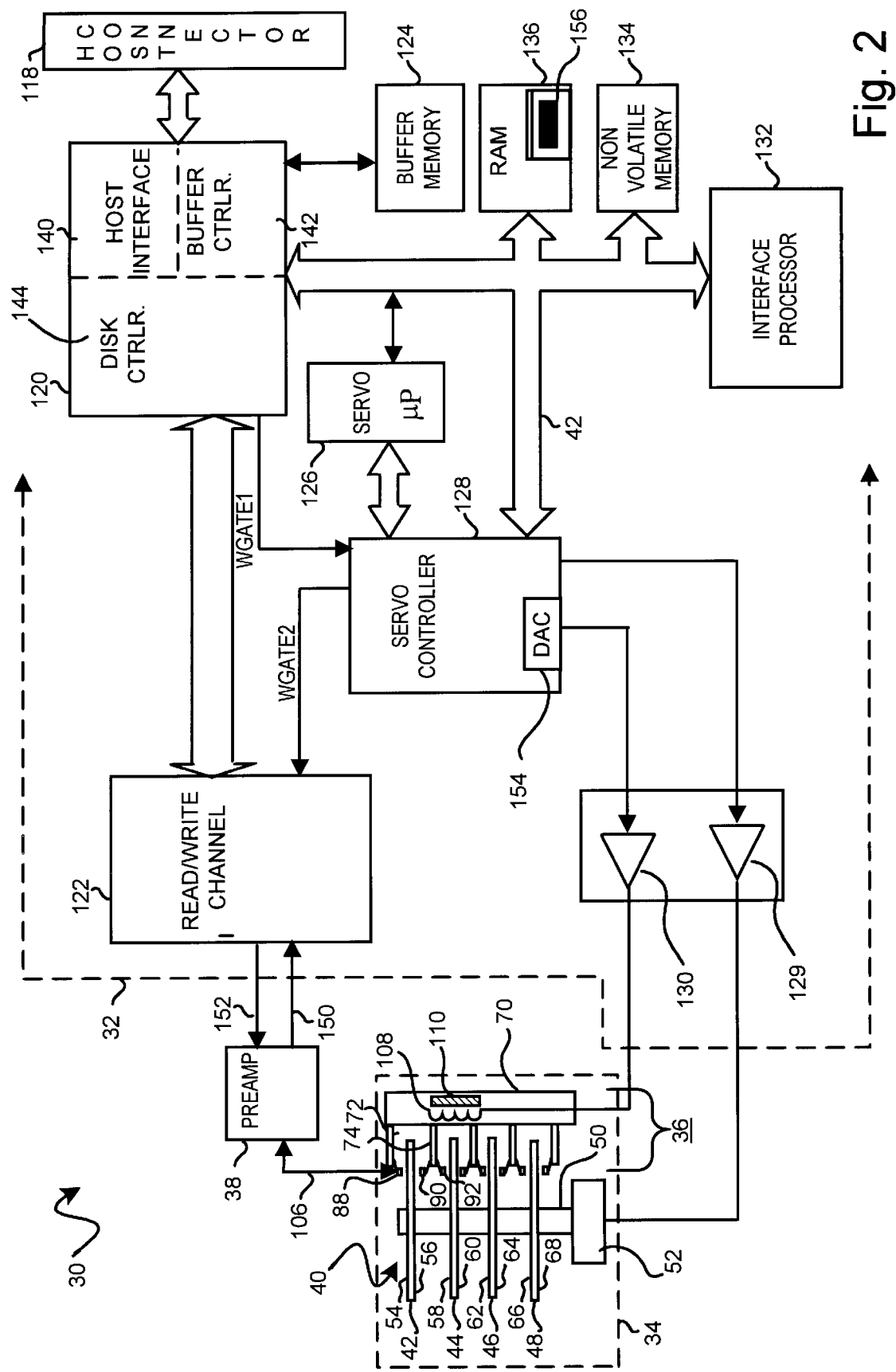
FIG. 2 is a block diagram illustrating one exemplary embodiment of a disk drive which efficiently stores zone parameter sets for reading and writing on a plurality of disk surfaces in accordance with the present invention.

In FIG. 2, a hard disk drive 30, according to the present invention, which efficiently stores zone control parameter sets in tables in memory for controlling reading and writing on multiple disk surfaces is shown. Disk drive 30 comprises disk controller circuit board 32 and head disk assembly (HDA) 34. Disk controller circuit board 32 forms a portion of an intelligent disk control system which provides an interface between a host (not shown) and HDA 34 for execution of read and write commands. The host can include a microprocessor based data processing system (e.g., a computer) or other system capable of performing a sequence of logical operations.

HDA 34 includes an actuator assembly 36, a preamplifier 38, and a disk assembly 40. Disk assembly 40 includes a plurality of magnetic media disks 42, 44, 46, 48, stacked on a rotatable spindle 50. Spindle assembly 50 is mechanically coupled to a spindle motor 52 for rotating the disks 42, 44, 46, 48 at a high rate of speed. Each disk 42, 44, 46, 48 includes two disk surfaces capable of storing data thereon. As shown, disk 42 includes disk surface 54 and disk surface 56; disk 44 includes disk surface 58 and disk surface 60; disk 46 includes disk surface 62 and disk surface 64; and disk 48 includes disk surface 66 and disk surface 68.

Actuator assembly 36 includes a voice coil motor (VCM) 70 and multiple actuator arms such as 72, 74 extending from VCM 70. Located at the end of each actuator arm are one or more transducer heads such as 88, 90, 92 which are associated with a respective disk surface e.g. 54, 56, 58. The transducer head associated with each disk surface communicates with the disk controller circuit board 32 via preamplifier 38 for reading and writing data on the associated disk surface. Preamplifier 38 is electrically coupled to each transducer head 88, 90, 92 etc by connecting means, indicated at 106, for receiving and recording signals which are representative of magnetic transitions on a selected disk surface. Preamplifier 38 provides an amplified signal to the read/write channel 122 of disk controller circuit board 32.

VCM 70 includes a coil 108 moving in proximity to a permanent magnet 110. Actuator arms 72, 74 are permanently coupled to VCM 70. VCM 70 controllably swings actuator arms 72, 74, back and forth over their associated disk surfaces 54, 56, 58, to access target data tracks on the associated disk surface.

Disk control circuit board 32 includes host connector 118, integrated circuit host interface and disk controller (HIDC) 120, read/write channel 122, buffer memory 124, servo microprocessor 126, servo controller 128, driver 130, interface processor 132, non-volatile memory 134, and RAM 136, each of which will be described in further detail in the following paragraphs.

HIDC 120 includes a host interface 140, a buffer controller 142, and a disk controller 144. Host interface 120 communicates with a host system (not shown) via host connector 118 by receiving commands and data from and transmitting status and data back to the host system. Buffer controller 142 controls a buffer memory 124 employed for storing data from the host system which is to be written to a disk surface (e.g., disk surface 54). In addition, buffer controller 142 controls buffer memory 124 for storing data read from disk surface 54. Host interface 140 provides for the data to be transmitted to and from the host system. Buffer memory 124 typically comprises random access memory (RAM), such as dynamic random access memory (DRAM).

Disk controller 144 sends data to and receives data from read/write channel 122. Disk controller 144 also performs error correction and error detection on data read from a disk surface.

Read/write channel 122 is coupled to preamplifier 138, indicated by read lines 150 and write lines 152. During a read operation, preamplifier 138 amplifies the transition pulses that are detected by a transducer head associated with a disk surface, and amplifies them to a signal level that can be processed by read/write channel 122. Read/write channel 122 receives the magnetic transition pulses read from the disk surface (through line 150) and further amplifies, filters and converts the transition pulses into digital data which is output to disk controller 144. During a write operation, the read/write channel 122 receives data from disk controller 144 and converts the data into pulses for writing data to a disk surface via write lines 152 and preamplifier 38. Preamplifier 138 generates current to drive the transducer head to write transitions on the disk surface.

Servo processor 126 receives a representative form of a position signal via preamplifier 38 and read/write channel 122 and performs calculations to determine the current position of a transducer head over its associated disk surface. For example, servo processor 126 commands servo controller 128 to control the position of transducer head 88 over disk surface 54 at a target data track for subsequent execution of read or write commands. A digital signal to analog converter (DAC) 154 in servo controller 128 responds to digital commands from servo processor 126 to provide a corresponding analog signal to VCM driver 130. Driver 130 is responsive to the analog signal from DAC 154 to provide a corresponding current to VCM 70 via driver 130. The current from driver 130 is provided to coil 108 of VCM 70 and causes movement actuator assembly 36 which in turn causes the attached actuator arms 72, 74, to swing and thereby move transducer head 88 over associated disk surface 54 to access target data tracks. Servo processor 126 also provides commands to servo controller 128 to control the rotational velocity of spindle motor 52. Servo processor 128 controls the rotational velocity of spindle motor 52 via servo controller 128 and spindle driver 129 to maintain a substantially constant operational rotational velocity of rotating disks 42, 44, 46, 48.

Servo system operational programs are stored in non-volatile memory 134, which may be a read-only memory (ROM) or flash memory, and are loaded into RAM 136 for execution. Alternatively, servo system operational programs are stored on reserve cylinders on a disk surface, such as 54. Upon start up of hard disk drive 30, disk drive programs such as servo system operational programs, are transferred into RAM 136 so they can be accessed by servo processor 126 for positioning a desired transducer head on a disk surface for execution of read and write commands. In an exemplary operation of disk drive 30, servo processor 36 receives a command to position actuator assembly 36 or accessing data in a specified target data track on a disk surface. During operation of disk drive 30, disk controller 144 keeps track of where transducer head 92 is circumferentially located over disk surface 54 and servo processor 126 keeps the transducer head tracking on the circular data track.

Interface processor 132 handles the flow of data and commands received by host interface 140 by sending commands and reading status to disk controller 144. Interface processor 132 ascertains which commands to process from a host system and when to process these commands, and directs other tasks performed by disk controller 144.

According to the present invention, zone control parameter sets associated with the reading and writing of data through read/write channel 122 on a disk surface are stored in non-volatile memory 134. Upon start up of disk drive 30, the interface processor 132 transfers the zone control parameter sets into a look-up table 156 in RAM 136. When reading from or writing to a specific data sector located on disk surface, the interface processor 132 accesses the required zone control parameters for that data sector from a look-up table 156 stored in RAM 136 and commands disk controller 144 to transfer data through read/write channel 122 according to those zone control parameters. As described in detail in the following paragraphs, the disk drive 30 according to the present invention stores control parameter sets for multiple disk surfaces in memory to accommodate an extended range of zone control parameter sets, while efficiently storing those zone control parameter sets in look-up table 156.

Figure 3:
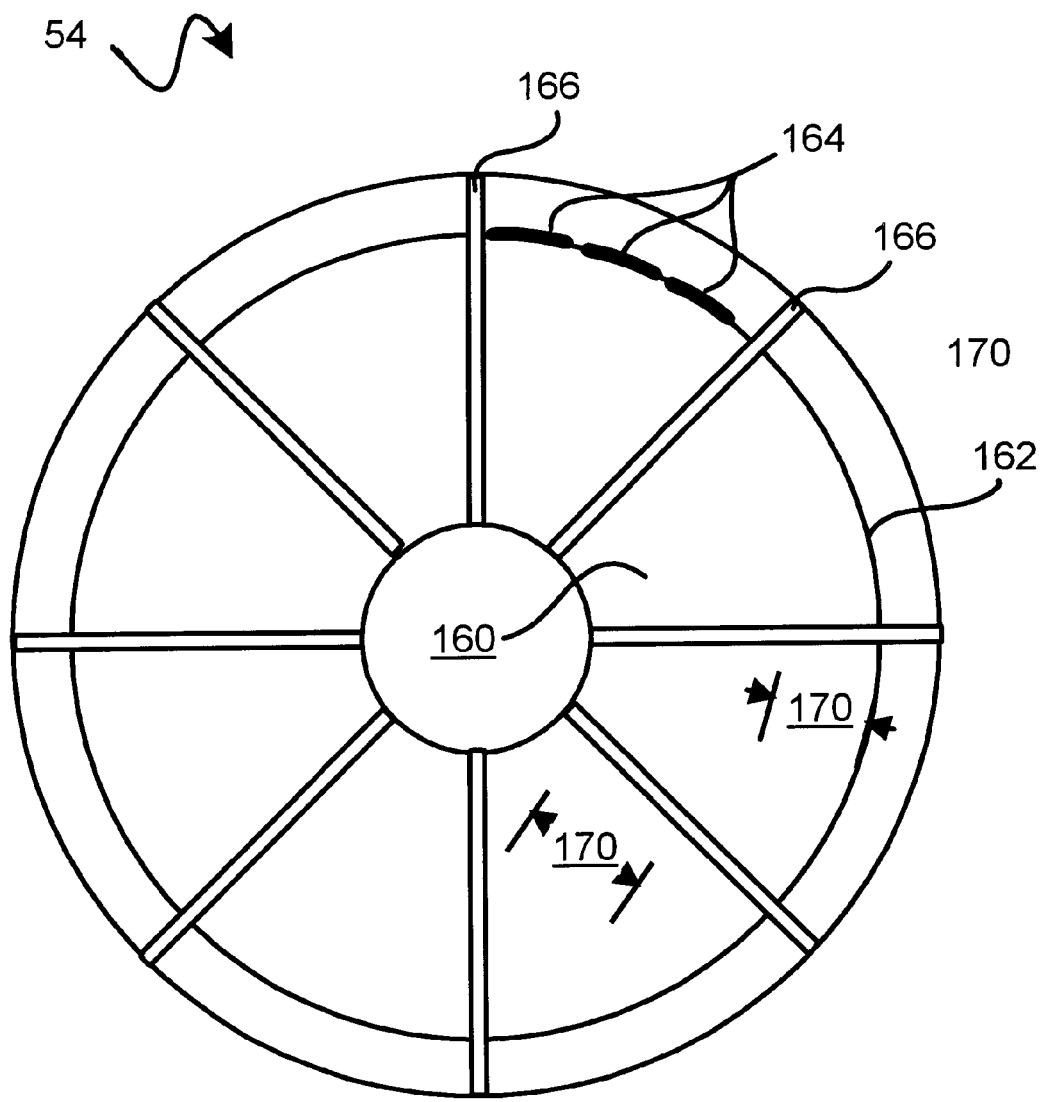
FIG. 3 is a plan view illustrating one exemplary embodiment of a disk surface.

FIG. 3 is a plan view illustrating one exemplary embodiment of a disk surface, indicated as disk surface 54, which is part of the HDA 34 of FIG. 2. The disk surface 54 includes an inner track 160 and an outer track 162. Data is stored on concentric, circular tracks (shown in FIG. 5) between inner track 160 and outer track 162. Recorded data on the disk surface is divided into groups of data sectors 164. Embedded servo information is recorded in servo sectors placed in radially continuous narrow wedges (termed "servo wedges") between data sectors 164, indicated at 166. The servo information contained in the servo wedges 166 may include the track number or address, sector number, timing (e.g., a servo sync word) and tracking information (e.g., servo bursts).

Figure 4:
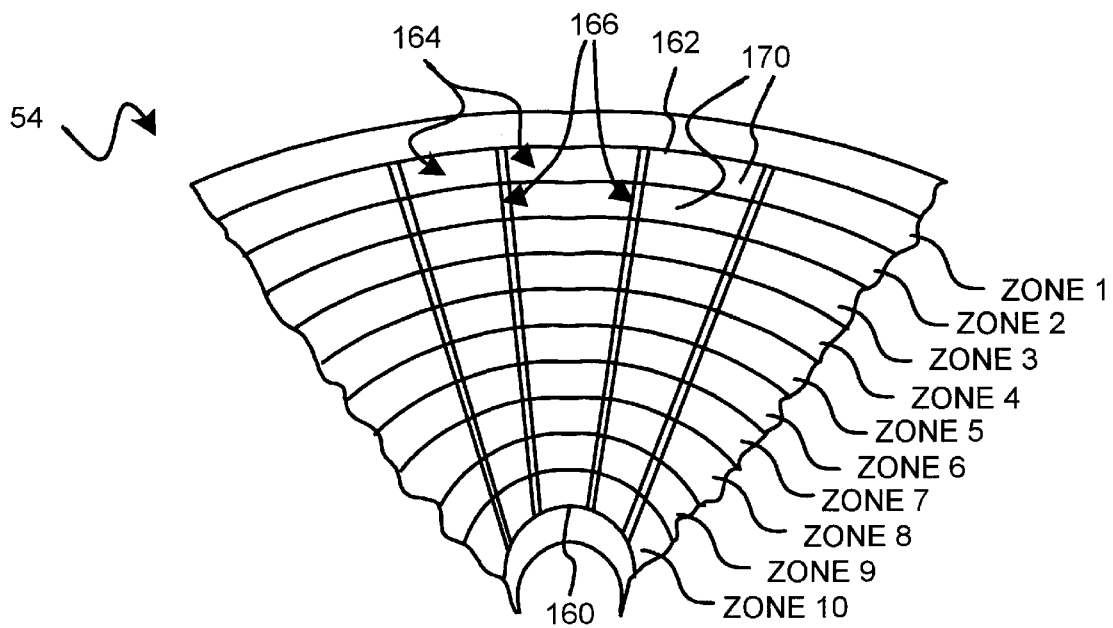
FIG. 4 is an enlarged partial plan view illustrating the grouping of data tracks into zones on a disk surface.

Using zone recording techniques, groups of adjacent data tracks are assigned to a plurality of zones between the inner track 160 and the outer track 162. Referring to FIG. 4, an enlarged partial plan view of disk surface 54 is illustrated.

Disk surface 54 has been partitioned into ten physical zones, indicated at 170 by concentric bands labeled ZONE 1, ZONE 2, ZONE 3, ZONE 4, ZONE 5, ZONE 6, ZONE 7, ZONE 8, ZONE 9 and ZONE 10. Disk surface 54 may be partitioned into any desired useable number of zones, which more typically, ranges between 10 and 16 zones.

Figure 5:
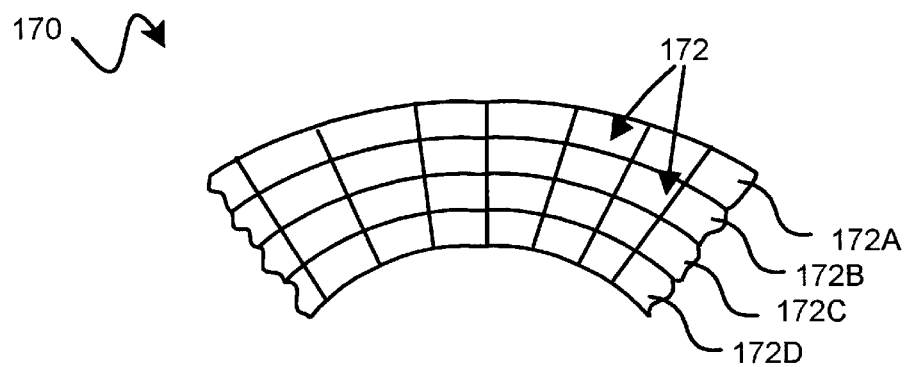
FIG. 5 is an enlarged partial plan view illustrating one exemplary embodiment of a portion of a zone on a disk surface.

In FIG. 5, an enlarged portion of a single zone 170 is illustrated. Data tracks 172 are indicated as 172A, 172B, 172C, 172D. Zone control parameter sets are defined for reading and writing data on data tracks 172 within each zone. Zone control parameters are defined as zone dependent variables, (i.e., control parameters which are unique for controlling the reading and writing of data in a specific zone of the disc surface). These zone parameter sets include physical parameters which define the zone (such as number of sectors per track, skew values, etc.) and data channel related parameters (such as recording frequencies, channel filter values, thresholds, etc.). In other words, within zone 170, each data track is read or written using the zone control parameters from the same zone control parameter set. For example, data is written to data tracks 172A, 172B, 172C, 172D at the same recording frequency.

Data tracks located near the inner track 160 of the disk surface 54 have a smaller circumference than the data tracks located near the outer track 162 of the disk surface 54. To compensate for these physical differences, the zone control parameters change as the drive moves between zones. For example, the frequency rate at which data is written to disk surface 54 decreases from zone one to zone 10, to maintain a maximum uniform storage bit density. The inventors recognized that a low performing head can make use of a contiguous or "shifted" subset of the decreasing frequency zones over a portion of its corresponding disk surface. This shifted subset forms a basis for improved efficiency in storing zone parameter sets.

Figure 6:
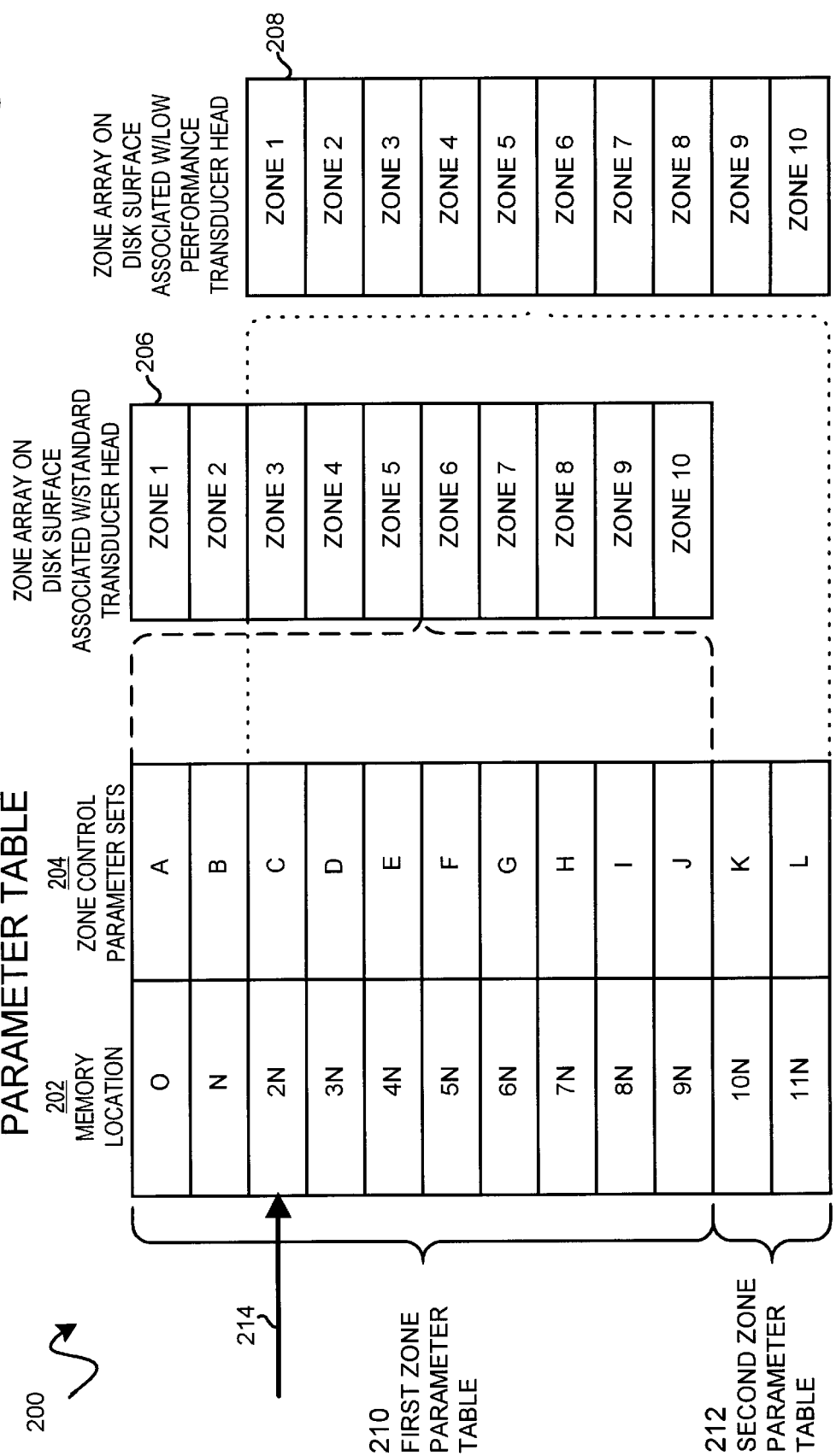
FIG. 6 is a table illustrating one exemplary embodiment of mapping of a first disk surface and a second disk surface to a common logical zone parameter table including a first zone parameter table and a second parameter table in accordance with the present invention.

In FIG. 6, a logical zone parameter table 200 illustrating efficiently storing zone parameter sets in memory for a plurality of disk surfaces for a disk drive in accordance with the present invention is shown. The logical zone parameter table 200 includes first column 202 and second column 204, which are representative of a look-up table stored in RAM. In the exemplary embodiment shown, column 202 represents a block of memory locations, divided into sub-blocks of N locations designated by relative addresses 0, N, 2N, 3N, 4N, 5N, 6N, 7N, 8N, 9N, 10N and 11N. Column 204 is representative of individual zone control parameter sets, indicated by letters A, B, C, D, E, F, G, J, H, J, K, L, stored at each corresponding sub-block. For example, zone control parameter set A is stored at sub-block 0, zone control parameter set B is stored at sub-block N, etc. As such, a disk surface having ten zones requires ten sub-blocks for ten zone control parameter sets using a total 10N of memory space.

Logical zone parameter table 200 includes first zone parameter table 210 and second zone parameter table 212. First zone parameter table 210 includes zone control parameter sets A–J stored in sub-blocks 0–9N, and; second zone parameter table 212 includes zone control parameter sets K–L stored in sub-blocks 10N and 11N.

In one preferred embodiment, the logical zone parameter table 200 zone control parameter sets A–L are stored in memory location 0–11N in order of decreasing recording frequency parameter. In particular, the zone control parameter sets A–J in first zone parameter table 210 are stored in order of decreasing recording frequency parameter, and the zone control parameter sets K–L in second zone parameter table 212 are stored in order of decreasing frequency parameter.

Zone array 206 and zone array 208 are representative of the zones disposed on two disk surfaces. In the exemplary embodiment shown, zone array 206 is representative of a disk surface associated with a standard performance transducer head (e.g., disk surface 54) and zone array 208 is representative of a disk surface associated with a low performing transducer head (e.g., disk surface 56). It may be desirable to have different zone control parameter sets associated with corresponding zones on multiple disk surfaces to maximize disk drive capacity. For example, disk surface 54 may have a standard performing transducer head associated with the disk surface, and as such, data may be written to the disk surface at a relatively high recording frequency. A low performance transducer head is associated with disk surface 56 (relative to disk surface 54), and as such, it is desirable to have modified zone control parameter sets associated with the disk surface 56, such as data being written to the disk surface 56 at a lower recording frequency.

According to the present invention, some zone control parameter sets are shared (i.e., used by both standard transducer heads and low performance transducer heads) within logical zone parameter table 200, decreasing the amount of memory space required to store table 200 in RAM. In the exemplary embodiment shown, first zone parameter table 210 includes a zone control parameter set for each zone of disk surface 54. As such, disk surface 54 includes ten zones and first zone parameter table 210 includes ten sub-blocks of memory to store ten zone control parameter sets. For disk surface 54, zone 1 uses zone control parameter set A located at memory location 0; zone 2 uses zone control parameter set B located at memory location N; zone 3 uses zone control parameter set C located at memory location 2N; zone 4 uses zone control parameter set D located at memory location 3N; zone 5 uses zone control parameter set E located at memory location 4N; zone 6 uses zone control parameter set F located at memory location 5N; zone 7 uses zone control parameter set G located at memory location 6N; zone 8 uses zone control parameter H located at memory location 7N; zone 9 uses zone control parameter set I located at memory location 8N; and zone 10 uses zone control parameter set J located at memory location 9N.

Second zone parameter table 212 includes two zone control parameter sets K and L. The second zone parameter table 212 parameter sets K and L are located in memory blocks beginning at memory locations 10N and 11N, and are not included in first zone parameter table 210.

Disk surface 56 uses zone control parameter sets from first zone parameter table 210 and second zone parameter table 212. Means are provided for extracting zone control parameter sets for disk surface 56 from the first zone parameter table 210 and the second zone parameter table 212. In one exemplary embodiment shown, the means for extracting includes an offset pointer 214 to the first zone parameter table 210, allowing the poor performance disk surface 56 to use zone control parameter sets located in first zone parameter table 210, which are also used by disk surface 54. Since in the exemplary embodiment shown, the zone control parameter sets are stored in order of decreasing frequency, the disk surface 56 for zone 1 uses the control parameter set C stored at memory location 2N (the same zone control parameter set used for zone 3 of disk surface 54). Similarly, disk surface 56 zone 2 uses zone control parameter set D located at memory location 3N, zone 3 uses zone control parameter set E located at memory location 4N; zone 4 uses zone control parameter set F located at memory location 5N; zone 5 uses zone control parameter set G located at memory location 6N; zone 6 uses zone control parameter set H located at memory location 7N; zone 7 uses zone control parameter set I located at memory location 8N; and zone 8 uses zone control parameter set J located at memory location 9N. Referring to second zone parameter table 212, disk surface 56 zone 9 uses zone control parameter set K located at memory location 10N; and zone 10 uses zone control parameter set L located at memory location 11N.

Disk surface 56 shares a portion of first zone parameter table 210 with disk surface 54. Second zone parameter table 212 is smaller than first zone parameter table 210 requiring storage only for the parameter sets not in common with those in table 210. As such, the storage of zone control parameter set for disk surface 54 and disk surface 56 require only 12 memory sub-blocks, instead of 20 memory sub-blocks (ten for each disk surface).

Offset pointer 214 is directed to a desired memory location within first zone parameter table 210 which corresponds to the desired zone control parameter set for zone 1 of disk surface 56. An offset magnitude is defined by the number of memory locations in which offset pointer 214 is moved in the first zone parameter table 210 relative to the highest performing disk surface (i.e., the first memory location where zone control parameter sets are located). For example, the disk surface 54 zone 1 is mapped to memory location 0, and disk surface 56 zone 1 is mapped to memory location 2N, resulting in an offset magnitude of 2N or two memory sub-blocks. In one aspect, the offset magnitude is equal to the number of zone control parameter sets in the second parameter table 212. In another aspect, the offset magnitude is equal to the number of zone parameter sets extracted from the second zone parameter table 212 for disk surface 56.

Figure 7:
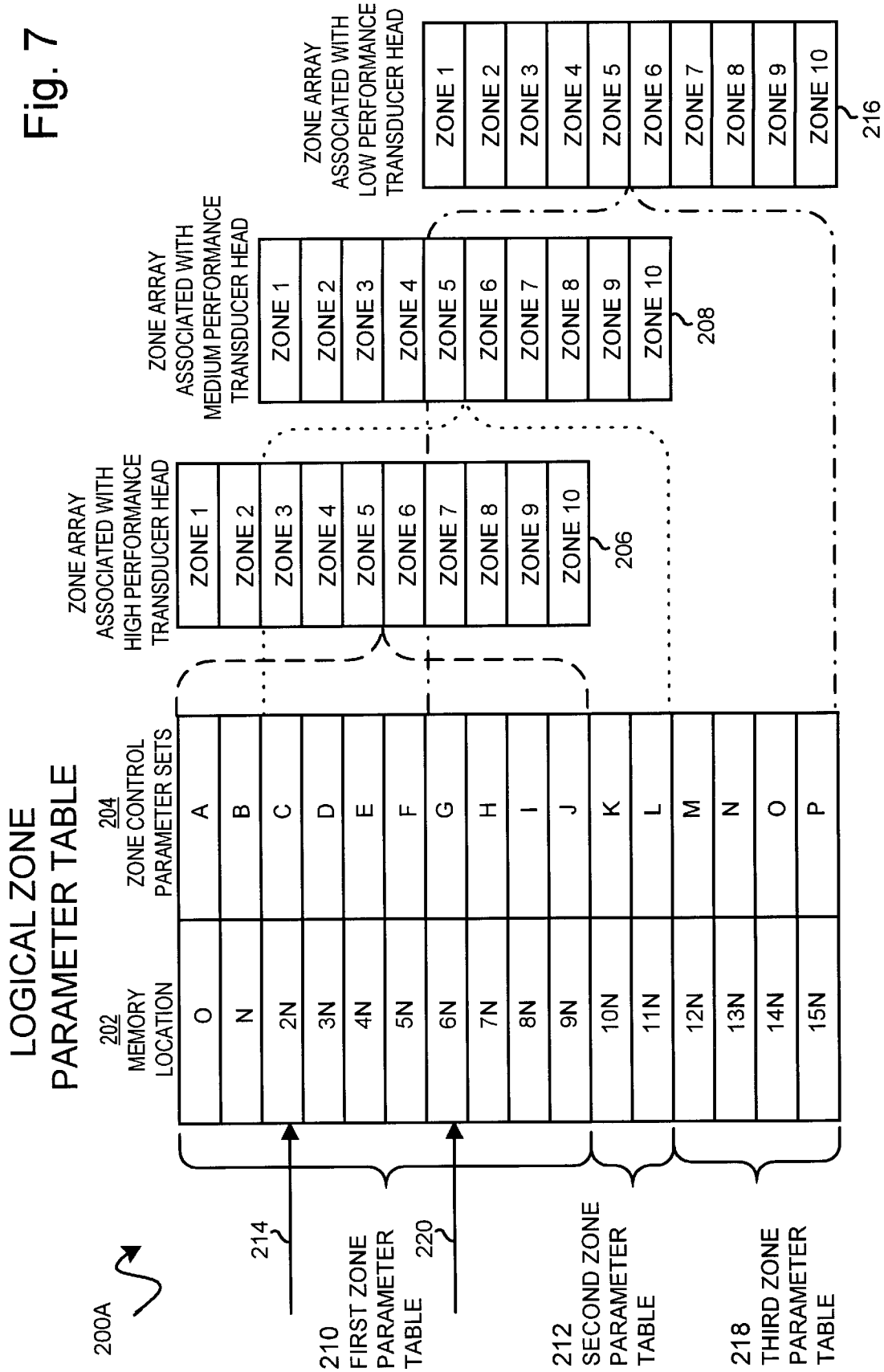
FIG. 7 is a table illustrating one exemplary embodiment of mapping three disk surfaces to a logical zone parameter table including a first zone parameter table, a second zone parameter table, and a third zone parameter table, in accordance with the present invention.

Referring to FIG. 7, it is recognized that any multiple of disk surfaces may be mapped to common locations in memory to optimize disk drive RAM usage. Logical zone parameter table 200A further supports a third zone array 216, disposed on disk surface 58. A third zone parameter table 218 is defined. The third zone parameter table 218 includes zone control parameter sets M, N, O and P which are not included in first zone parameter table 210 or second zone parameter table 212, and are stored in sub-blocks of memory beginning at corresponding memory locations 12N, 13N, 14N and 15N.

In this example, disk surface 54 can be viewed as a high performance disk surface (associated with a higher performing transducer head), disk surface 56 is a medium performance disk surface (associated with a medium performing transducer head) and disk surface 58 is a low performance disk surface (associated with a lower performing transducer head). Zone control parameter sets A through P are stored in memory locations 0–15N in order of decreasing frequency parameter. Accordingly, zone control parameter sets within each zone parameter table 210, 212, 218 are stored in order of decreasing frequency parameter.

Means are provided for extracting zone control parameter sets for disk surface 58 from the first zone parameter table 210, second zone parameter table 212 and third zone parameter table 218. The means for extracting includes a second offset pointer 220 to a memory sub-block in first zone parameter table 210. In the exemplary embodiment shown, second offset pointer 220 is directed to memory location 6N, resulting in disk surface 58 zone 1 using zone control parameter set G located at memory location 6N. Accordingly, zone 2 uses zone control parameter set H located at memory location 7N; zone 3 uses zone control parameter set I located at memory location 8N; zone 4 uses zone control parameter set J located at memory location 9N;

zone 5 uses zone control parameter set K located at memory location 10N; zone 6 uses zone control parameter L located at memory location 11N; zone 7 uses zone control parameter set M located at memory location 12N; zone 8 uses zone control parameter set N located at memory location 13N; zone 9 uses zone control parameter set O located at memory location 14N; and zone 10 uses zone control parameter set P located at memory location 15N.

Second offset pointer 220 is defined by an offset magnitude relative to the first memory location in table 200A where zone control parameter sets are stored and/or the memory location of the highest performing disk surface (i.e., the memory location 0 shown). For the exemplary embodiment shown, second offset pointer 220 has an offset magnitude of six blocks of memory. By mapping a number of differently performing disk surfaces (and associated transducer heads) to common tables stored in memory, memory storage space is conserved, increasing disk drive capacity. As will be apparent to one skilled in the art, other regular arrangements of parameter sets with corresponding offset pointers can be employed in the invention including but not limited to a reverse order of storage where parameter sets are stored in increasing order of frequency and the extraction starts from a "top-down" addressing scheme.

Figure 8:
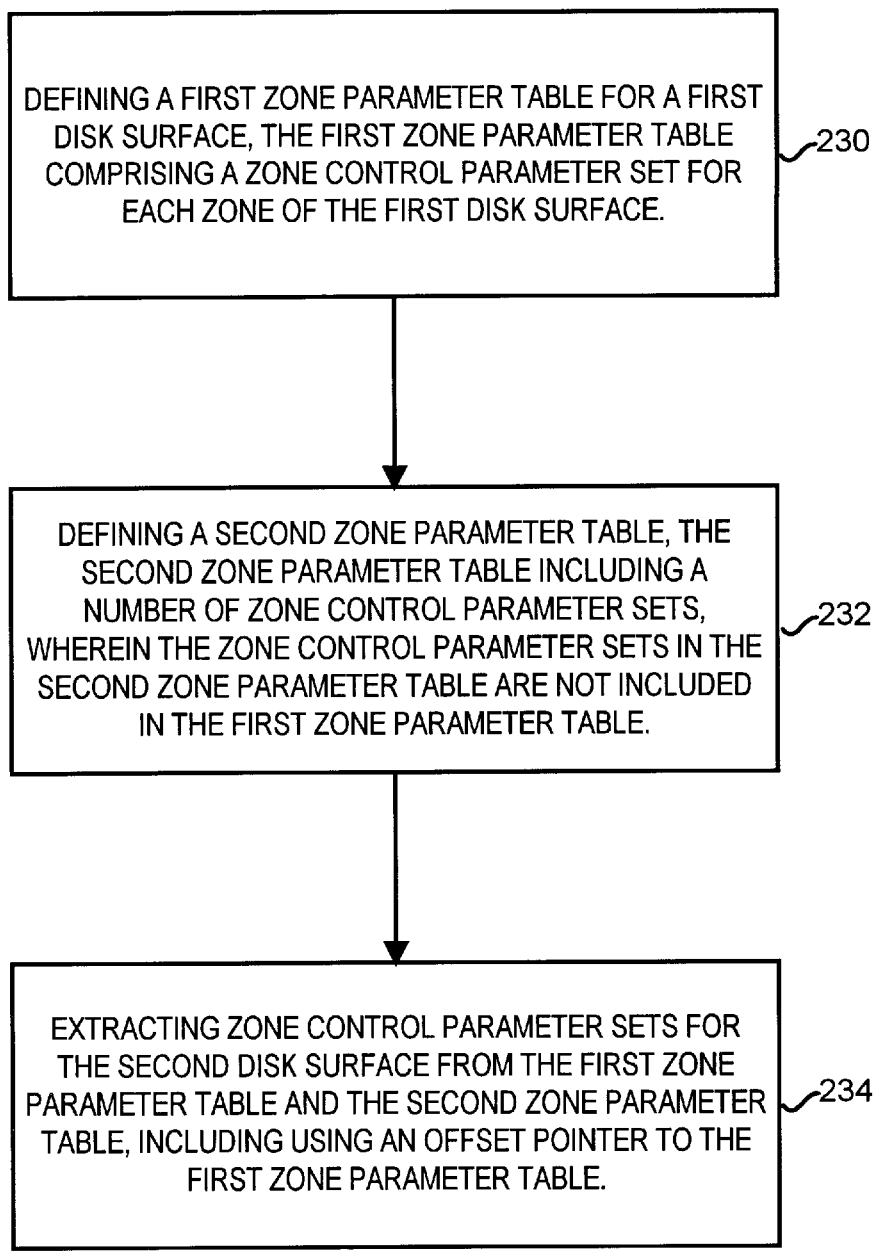
FIG. 8 is a flow chart illustrating one exemplary embodiment of a method for improving performance of a disk drive including efficiently storing zone control parameters in memory, in accordance with the present invention.

FIG. 8 is a flow chart illustrating one exemplary embodiment of a method for improving performance of a hard disk drive including efficiently storing zone control in memory in accordance with the present invention. The method is described in reference also to FIGS. 1–7. The disk drive 30 includes a disk control system 32 and a plurality of disk surfaces. Each disk surface has an associated transducer head in communication with the disk control system 32 for reading and writing data on the corresponding disk surface. Each disk surface is subdivided into a plurality of zones, wherein control parameter sets for each zone of a disk surface are stored in a table. The method includes the step 230 of defining a first zone parameter table 210 for a first disk surface 54, the first zone parameter table 210 comprising a zone control parameter set for each zone of the first disk surface. In step 232, a second zone parameter table 212 is defined, the second zone parameter table 212 including a number of zone control parameter sets, wherein the zone control parameter sets in the second zone parameter table 212 are not included in the first zone parameter table 210. In step 234, zone control parameter sets are extracted for the second disk surface 56 from the first zone parameter table and the second zone parameter table, including using an offset pointer 214 to the first zone parameter table. Thereafter, a command is executed to write data to the first disk surface using the first zone parameter table. A command may be executed to write data to the second disk surface 56 using the extracted zone control parameters for the second disk surface.

The steps 230 of defining the first zone control parameter table 210 and 232 defining the second zone control parameter table 212 may include providing an entry for each included zone control parameter set. The step of using an offset pointer 214 to the first zone parameter table 210 may further comprise the step of defining an offset magnitude which is equal to the number of control parameter sets in the second zone parameter table 212. In another aspect, the step of using an offset pointer 214 to the first zone parameter table 210 further comprises the step of defining an offset magnitude which is equal to the number of zone parameter sets extracted from the second zone parameter table for the second disk surface.

The method further comprises the step of defining each zone control parameter set to include a recording frequency parameter. The zone control parameter sets are arranged in the first zone parameter table 210 and the second zone parameter table 212 in order of decreasing recording frequency. Zone control parameter sets may be extracted from the first zone parameter table 210 for a third disk surface 58. The extracted zone control parameter sets for the third disk surface 58 may be the same zone control parameter sets for the first disk surface 54.

Figure 9:
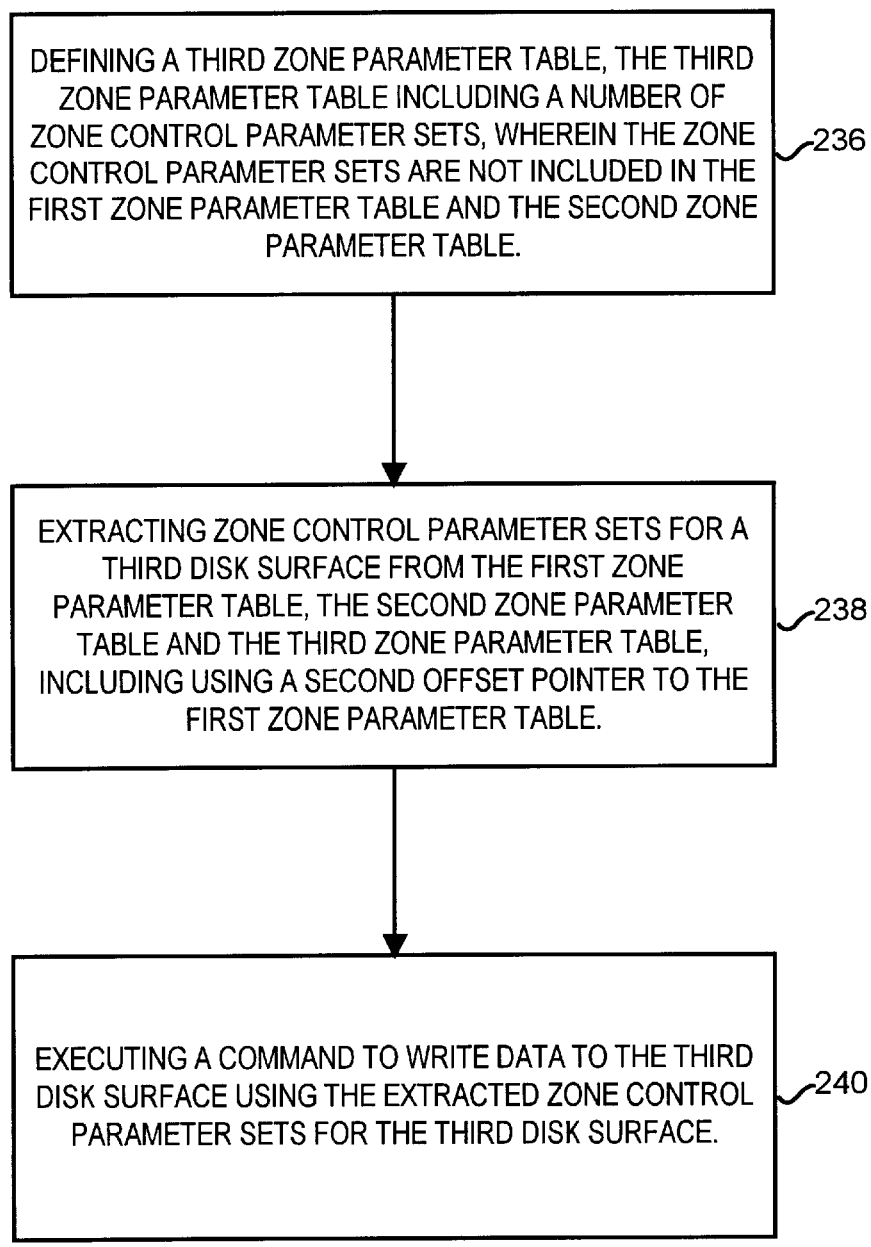
FIG. 9 is a flow chart further illustrating an exemplary embodiment of a method for improving performance of a disk drive including efficiently storing zone control parameters in memory, in accordance with the present invention.

As shown in FIG. 9, the method may further include the step 236 of defining a third zone parameter table 218, the third parameter table 218 including a number of zone control parameter sets, wherein the zone control parameter sets are not included in the first zone parameter table 210 and the second zone parameter table 212. Continuing in step 238, zone control parameter sets are extracted for a third disk surface 58 from the first zone parameter table 210, the second parameter table 212 and the third zone parameter table, including using a second offset pointer 220 to the first zone parameter table 210. A command to write data to the disk surface 58 is executed using the extracted zone control parameter sets for the third disk surface (240). The step of using a second offset pointer 220 to the first zone parameter table 210 further comprises the step of defining a second offset magnitude which is equal to the number of zone parameter sets extracted from the second zone parameter table 212 and the third zone parameter table 218 for the third disk surface 58.

We claim:

1. A disk drive including a disk control system and a plurality of disk surfaces, each disk surface having an associated transducer head in communication with the disk control system for reading and writing data to the disk surface, wherein each disk surface is subdivided into a plurality of zones, and wherein control parameter sets for each zone of a disk surface are stored in a table, the disk drive further comprising:

a first disk surface and a second disk surface;

a first zone parameter table for the first disk surface, the first zone parameter table comprising a zone control parameter set for each zone of the first disk surface;

a second zone parameter table, the second zone parameter table including a number of zone control parameter sets, wherein the zone control parameter sets in the second zone parameter table are not included in the first zone parameter table; and means for extracting zone control parameter sets for the second disk surface from the first zone parameter table and the second zone parameter table, the means for extracting zone control parameter sets including an offset pointer to the first zone parameter table.

2. The disk drive of claim 1, wherein the first zone parameter table and the second zone parameter table comprise an entry for each included zone control parameter set.

3. The disk drive of claim 1, wherein the first zone parameter table and the second zone parameter table define a logical zone parameter table.

4. The disk drive of claim 1, wherein the offset pointer to the first zone parameter table includes an offset magnitude, and wherein the offset magnitude is equal to the number of zone control parameter sets in the second zone parameter table.

5. The disk drive of claim 1, wherein the offset pointer to the first zone parameter table includes an offset magnitude, and wherein the offset magnitude is equal to the number of zone control parameter sets extracted from the second zone parameter table for the second disk surface.

6. The disk drive of claim 1, wherein each zone control parameter set includes a recording frequency parameter, and wherein the zone control parameter sets in the first zone parameter table and the second zone parameter table are arranged in order of recording frequency parameter.

7. The disk drive of claim 1, wherein the first zone parameter table and the second zone parameter table are stored in random access memory.

8. The disk drive of claim 1, further comprising a third disk surface, wherein the first zone parameter table comprises a zone control parameter set for each zone of the third disk surface.

9. The disk drive of claim 1, further comprising a third disk surface, wherein the zone control parameter sets for the third disk surface are the same as the zone control parameter sets for the second disk surface.

10. The disk drive of claim 1, further comprising:
a third zone parameter table, the third zone parameter table including a number of zone control parameter sets, wherein the zone control parameter sets in the third zone control parameter table are not included in the first zone parameter table and the second zone parameter table.

11. The disk drive of claim 10, further comprising:
a third disk surface; and
means for extracting zone control parameter sets for the third disk surface from the first zone parameter table, the second zone parameter table, and the third zone parameter table, the means for extracting zone control parameter sets including a second offset pointer to the first zone parameter table.

12. The disk drive of claim 11, wherein the second offset pointer to the first zone parameter table for the third disk surface includes an offset magnitude, and wherein the offset magnitude is equal to the number of zone control parameter sets extracted from the second zone parameter table and the third zone parameter table for the third disk surface.

13. A method for improving performance of a disk drive including efficiently storing zone control parameters, the disk drive including a disk control system and a plurality of disk surfaces, each disk surface having an associated transducer head in communication with the disk control system for reading and writing data to the disk surface, wherein each disk surface is subdivided into a plurality of zones, and wherein control parameter sets for each zone of a disk surface are stored in a table, the method comprising the steps of:
defining a first zone parameter table for a first disk surface, the first zone parameter table comprising a zone control parameter set for each zone of the first disk surface;
defining a second zone parameter table, the second zone parameter table including a number of zone control parameter sets, wherein the zone control parameter sets in the second zone parameter table are not included in the first zone parameter table; and
extracting zone control parameter sets for the second disk surface from the first zone parameter table and the second zone parameter table, including using an offset pointer to the first zone parameter table.

14. The method of claim 13, further comprising the step of executing a command to write data to the first disk surface using the first zone parameter table.

15. The method of claim 13, further comprising the step of executing a command to write data to the second disk surface using the extracted zone control parameters for the second disk surface.

16. The method of claim 13, wherein the steps of defining a first zone control parameter table and defining a second zone control parameter table include providing an entry for each included zone control parameter set.

17. The method of claim 13, wherein the step of using an offset pointer to the first zone parameter table further comprises the step of defining an offset magnitude which is equal to the number of zone control parameter sets in the second zone parameter table.

18. The method of claim 13, wherein the step of using an offset pointer to the first zone parameter table further comprises the step of defining an offset magnitude which is equal to the number of zone control parameter sets extracted from the second zone parameter table for the second disk surface.

19. The method of claim 13, further comprising the steps of:
defining each zone control parameter set to include a recording frequency parameter; and
arranging the zone control parameter in the first zone parameter table and the second zone parameter table in order of recording frequency.

20. The method of claim 13, further comprising the step of storing the first zone parameter table and the second zone parameter table in random access memory.

21. The method of claim 13, further comprising the step of extracting zone control parameter sets for a third disk surface from the first zone parameter table.

22. The method of claim 13, further comprising the steps of:
defining a third zone parameter table, the third zone parameter table including a number of zone control parameter sets, wherein the zone control parameter sets are not included in the first zone parameter table and the second zone parameter table;
extracting zone control parameter sets for a third disk surface from the first zone parameter table, the second zone parameter table and the third zone parameter table, including using a second offset pointer to the first zone parameter table; and
executing a command to write data to the third disk surface using the extracted zone control parameter sets for the third disk surface.

23. The method of claim 22, wherein the step of using a second offset pointer to the first zone parameter table further comprises the step of defining a second offset magnitude which is equal to the number of zone parameter sets extracted from the second zone parameter table and the third zone parameter table for the third disk surface.

* * * * *